United States Patent
Wang

(10) Patent No.: US 9,031,353 B2
(45) Date of Patent: May 12, 2015

(54) METHOD AND APPARATUS FOR REDUCING SPATIAL NOISE OF IMAGES

(75) Inventor: Jian-Chao Wang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1011 days.

(21) Appl. No.: 12/543,754

(22) Filed: Aug. 19, 2009

(65) Prior Publication Data

US 2010/0239164 A1    Sep. 23, 2010

(30) Foreign Application Priority Data

Mar. 18, 2009   (TW) ............................... 98108831 A

(51) Int. Cl.
*G06K 9/40*   (2006.01)
*G06T 5/20*   (2006.01)
*G06T 5/00*   (2006.01)

(52) U.S. Cl.
CPC ......... *G06T 5/20* (2013.01); *G06T 2207/20021* (2013.01); *G06T 5/002* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 5,086,484 A * | 2/1992 | Katayama et al. ............ | 382/270 |
| 6,771,793 B1 * | 8/2004 | Yamada ........................ | 382/264 |
| 6,904,169 B2 * | 6/2005 | Kalevo et al. ................. | 382/167 |
| 7,486,837 B2 * | 2/2009 | Motomura et al. ........... | 382/274 |
| 7,929,798 B2 | 4/2011 | Subbotin | |
| 8,145,005 B2 * | 3/2012 | Incesu et al. .................. | 382/254 |
| 2001/0055428 A1 * | 12/2001 | Hayashi ........................ | 382/274 |
| 2005/0100237 A1 * | 5/2005 | Kong et al. .................... | 382/261 |
| 2005/0100241 A1 * | 5/2005 | Kong et al. .................... | 382/275 |
| 2005/0135700 A1 * | 6/2005 | Anderson ..................... | 382/261 |
| 2005/0163380 A1 * | 7/2005 | Wang et al. ................... | 382/199 |
| 2006/0039624 A1 * | 2/2006 | Kong et al. .................... | 382/274 |
| 2006/0233456 A1 * | 10/2006 | Ahn et al. ..................... | 382/275 |
| 2006/0284989 A1 * | 12/2006 | Kang et al. ................. | 348/222.1 |
| 2008/0043124 A1 | 2/2008 | Subbotin | |
| 2009/0041373 A1 * | 2/2009 | Incesu et al. .................. | 382/264 |
| 2010/0215267 A1 * | 8/2010 | Aldrich et al. ............... | 382/167 |
| 2011/0149122 A1 | 6/2011 | Subbotin | |

FOREIGN PATENT DOCUMENTS

CN            101326808 A          12/2008

OTHER PUBLICATIONS

Taiwan Office Action dated Nov. 27, 2013.

* cited by examiner

*Primary Examiner* — Randolph I Chu
(74) *Attorney, Agent, or Firm* — Rabin & Berdo, P.C.

(57) ABSTRACT

A method for reducing spatial noise of images includes the following steps. A target pixel is obtained and an operating block is built accordingly. Pixel values of the target pixel and multiple neighboring pixels in the operating block are operated to obtain a variance corresponding to the operating block. Whether the target pixel is characteristic is judged according to the variance. If the target pixel is not characteristic, the multiple pixels in the operating block are filtered to obtain a modulated pixel value. The pixel value of the target pixel is updated to the modulated pixel value.

14 Claims, 5 Drawing Sheets

METHOD AND APPARATUS FOR REDUCING SPATIAL NOISE OF IMAGES

This application claims the benefit of Taiwan application Serial No. 98108831, filed Mar. 18, 2009, the subject matter of which is incorporated herein by reference.

BACKGROUND OF THE INVENTION

1. Field of the Invention

The invention relates in general to a method and an apparatus for reducing spatial noise of images, and more particularly to a method and an apparatus capable of effectively reducing spatial noise of images.

2. Description of the Related Art

FIG. 1 (Prior Art) is a schematic illustration showing a conventional image system 100. Referring to FIG. 1, the image system 100 includes an image generating end 110 and an image receiving end 120. The image generating end 110 is, for example, an image combination apparatus or an image capture device for generating an original image and outputting the original image to the image receiving end 120. However, the original image may be interfered by the external environment during the transmission process, or errors may be generated when the original image is converted into the format that may be transmitted. Consequently, the image received by the image receiving end 120 may be an unideal image containing spatial noise rather than the original image. Thus, various filters are utilized to remove the spatial noise. However, after the image receiving end 120 utilizes a filter to process the received image, the detailed portions of the image may also be removed and the image sharpness is reduced so that the blurred image is obtained.

SUMMARY OF THE INVENTION

The invention is directed to a method and an apparatus for reducing spatial noise of images, wherein the characteristic pixels are cut in a statistical manner and the corresponding processing is performed so that the spatial noise of the images may be effectively reduced, and the detailed portions of the images may be reserved.

According to a first aspect of the present invention, a method for reducing spatial noise of images is provided. The method includes the steps of: obtaining a target pixel and building an operating block accordingly; operating pixel values of the target pixel and a plurality of neighboring pixels in the operating block to obtain a variance corresponding to the operating block; judging whether the target pixel is characteristic according to the variance; filtering the pixels in the operating block to obtain a modulated pixel value if the target pixel is not characteristic; and updating the pixel value of the target pixel to the modulated pixel value.

According to a second aspect of the present invention, an apparatus for reducing spatial noise of images is provided. The apparatus includes a statistics unit, an analysis unit, a subtracter, a filter and an adder. The statistics unit receives an image frame and operates a plurality of pixels of the image frame to obtain a plurality of variances. The analysis unit judges whether the pixels are characteristic according to the variances, respectively. The subtracter receives the image frame and outputs the pixels, which are not characteristic, according to judgement results of the analysis unit. The filter filters the pixels, which are not characteristic, to obtain a plurality of modulated pixel values. The adder outputs a modulated image frame according to pixel values of the pixels, which are characteristic, and the modulated pixel values.

The invention will become apparent from the following detailed description of the preferred but non-limiting embodiments. The following description is made with reference to the accompanying drawings.

DETAILED DESCRIPTION OF THE INVENTION

The invention provides a method and an apparatus for reducing spatial noise of images, wherein a statistics process is performed on the pixels in an image frame to cut the characteristic pixels and the corresponding process is performed to effectively reduce the spatial noise of the images and reserve the detailed portions of the images.

Figure 1:
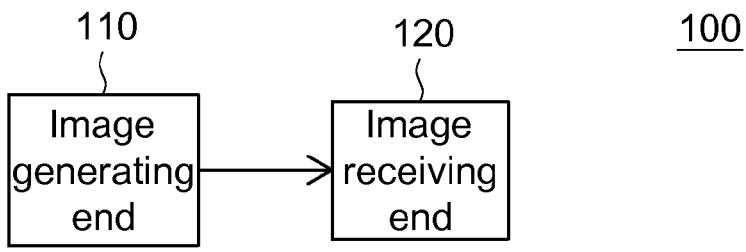
FIG. 1 (Prior Art) is a schematic illustration showing a conventional image system.
Figure 2:
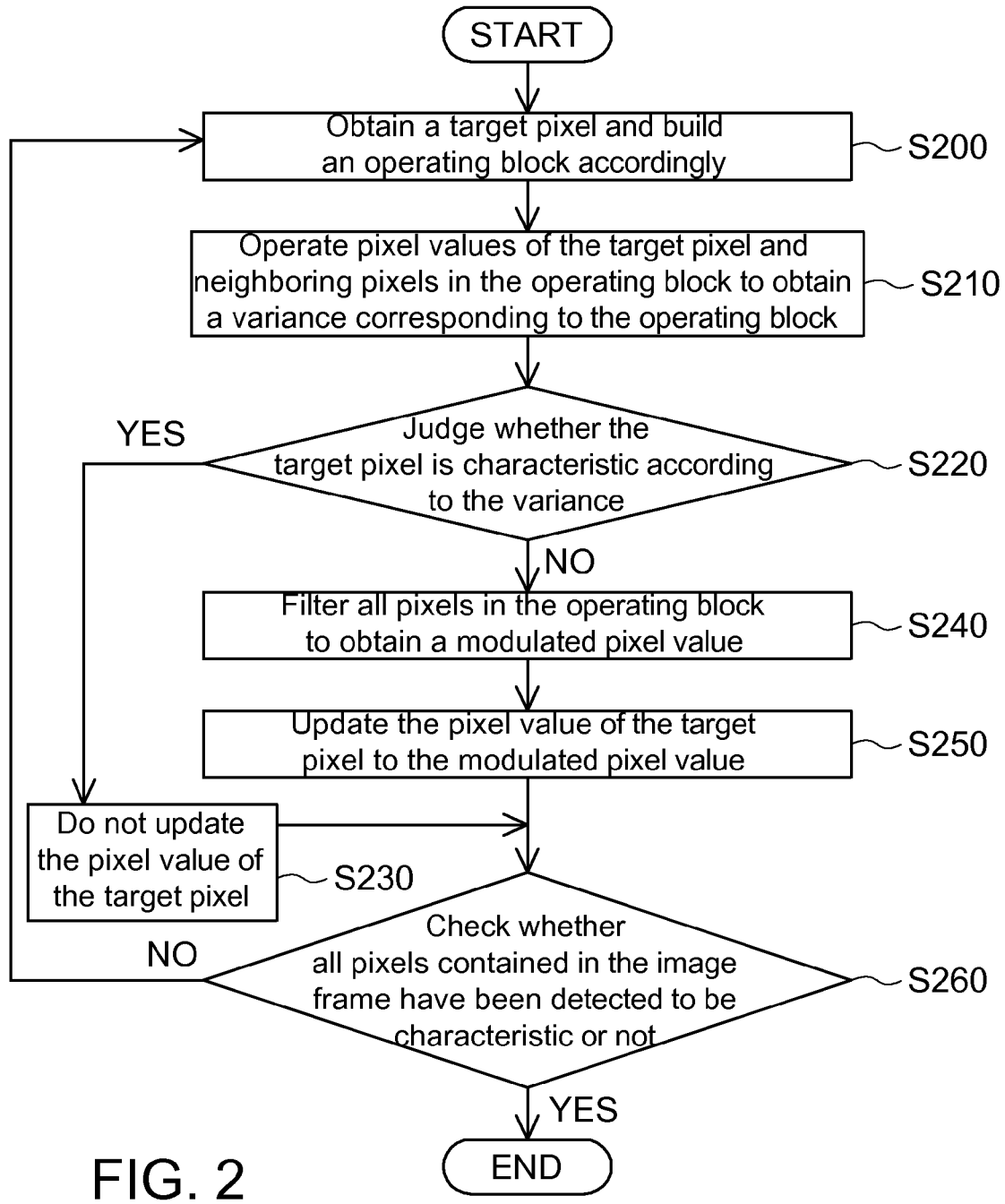
FIG. 2 is a flow chart showing a method for reducing spatial noise of images according to a preferred embodiment of the invention.

FIG. 2 is a flow chart showing a method for reducing spatial noise of images according to a preferred embodiment of the invention. In step S200, a target pixel is obtained and an operating block is built accordingly. The operating block substantially includes the target pixel and multiple neighboring pixels. The target pixel pertains to an image frame. The range covered by the operating block is changed as the property of the image frame is changed.

Figure 3A:
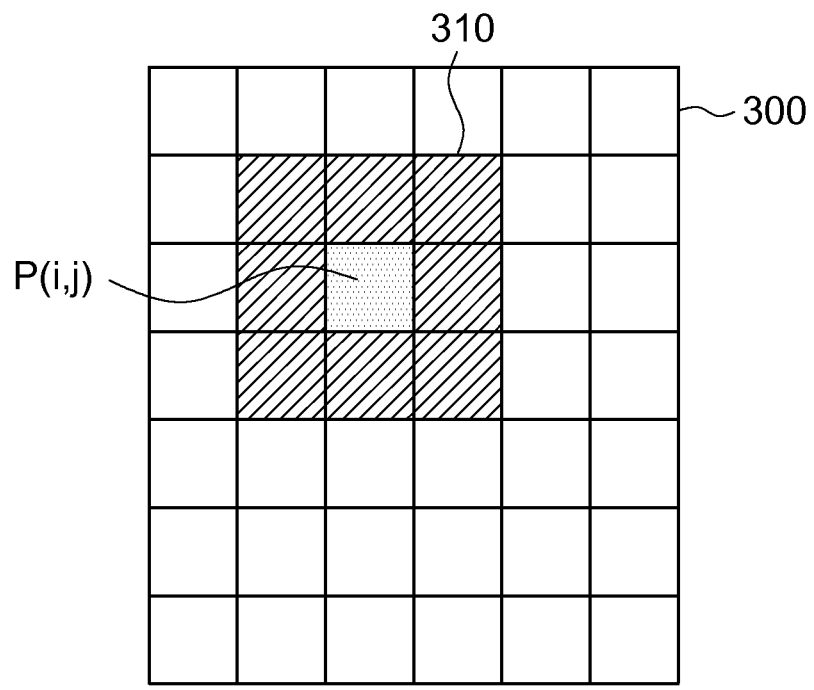
FIG. 3A is a schematic illustration showing a first example of an operating block according to the preferred embodiment of the invention.

If the image frame only contains one field, then the operating block includes an M×N rectangular region, wherein M and N are positive integers. FIG. 3A is a schematic illustration showing a first example of an operating block according to the preferred embodiment of the invention. Referring to FIG. 3A, an image frame 300 only contains one field, and an operating block 310 is substantially a 3×3 mask, which includes a target pixel P(i, j) (dotted region) and eight neighboring pixels (hatched regions). The target pixel P(i, j) is not inevitably located at a center position of the operating block 310.

Figure 3B:
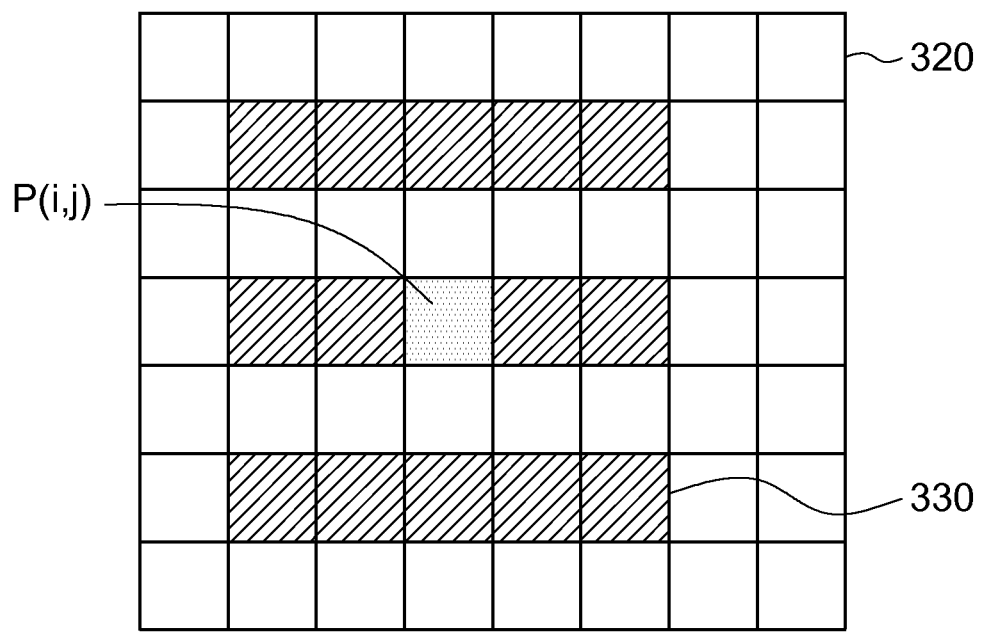
FIG. 3B is a schematic illustration showing a second example of the operating block according to the preferred embodiment of the invention.

If the image frame includes multiple interlaced fields, then the operating block includes multiple rows of pixels, which do not neighbor on one another. FIG. 3B is a schematic illustration showing a second example of the operating block according to the preferred embodiment of the invention. Referring to FIG. 3B, an image frame 320 includes two interlaced fields, and an operating block 330 substantially masks three rows of pixels (hatched regions), which do not neighbor on one another and contain the target pixel P(i, j) (dotted region).

Figure 3C:
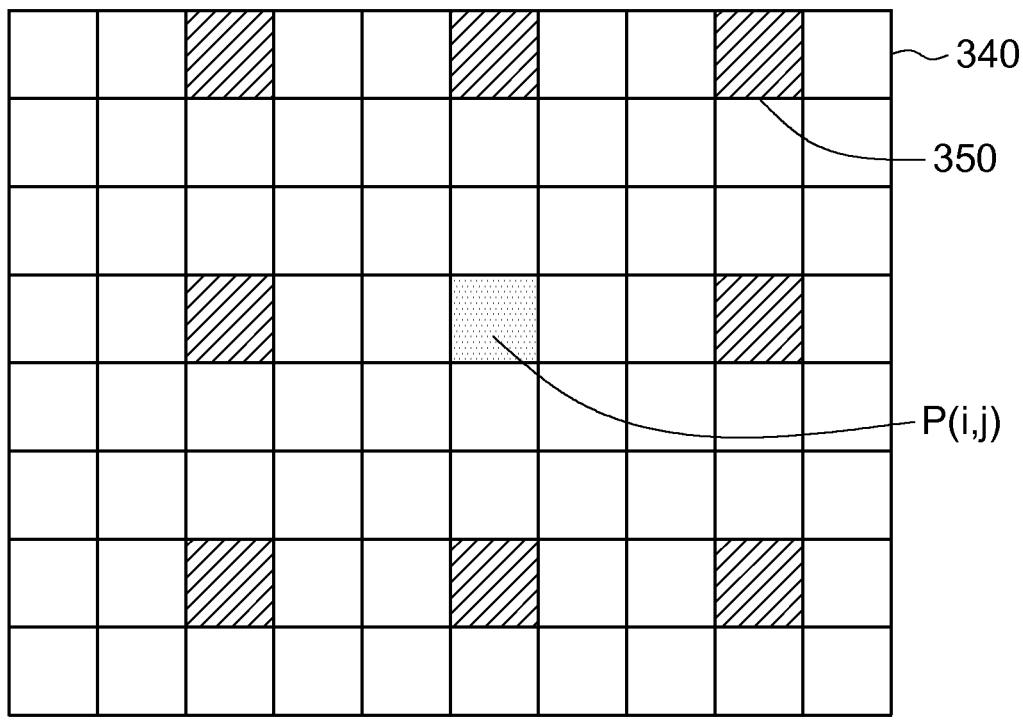
FIG. 3C is a schematic illustration showing a third example of the operating block according to the preferred embodiment of the invention.

If a discrete operating range is generated after the image frame is operated, then the target pixel and multiple neighboring pixels contained in the operating block may not neighbor on one another. FIG. 3C is a schematic illustration showing a third example of the operating block according to the preferred embodiment of the invention. As shown in FIG. 3C, an image frame 340 operates at different sub-frequency bands after the wavelet transformation, and an operating block 350 substantially masks the target pixel P(i, j) (dotted region) and the eight neighboring pixels (hatched regions), which do not neighbor on one another.

In step S210, the pixel values of the target pixel and the neighboring pixels in the operating block are operated to obtain a variance corresponding to the operating block. In practice, an average of the pixel values of all pixels in the operating block is first calculated in the step S210, and then the variance is calculated according to the average and the pixel values of all the pixels in the operating block. In step S220, it is judged whether the target pixel is characteristic according to the variance. The steps S210 and S220 are substantially for comparing the target pixel with other pixels in the operating block to determine the differences therebetween.

In the step S220, it is possible to preset a threshold, and then compare the variance with the threshold to determine whether the target pixel is characteristic. If the variance is greater than the threshold, then the target pixel is judged to be characteristic. If the variance is smaller than the threshold, then the target pixel is judged to be not characteristic. The characteristic target pixel is the pixel having edge information, for example, or the pixel having the dotted characteristic. That is, the pixel judged to be characteristic may be regarded as the detailed portion in the image frame. If the target pixel is judged to be characteristic, the pixel value of the target pixel is not updated in the step S230. Consequently, the detailed portions in the image frame may be reserved and cannot be damaged.

If the target pixel is judged to be not characteristic, all pixels in the operating block are filtered to obtain a modulated pixel value in the step S240. If the target pixel is judged to be not characteristic, then the target pixel may be regarded as the smoother portion in the image frame. So, the filtering operation is performed to remove the spatial noise that may be taken. The filtering operation may be performed by a low-pass filter, a median filter, an adaptive filter, a sigma filter or other filters according to the user's requirements.

Thereafter, in step S250, the pixel value of the target pixel is updated to the modulated pixel value. Then, in step S260, it is checked whether all the pixels contained in the image frame have been detected to be characteristic or not. If not, the procedure returns to the step S200 to repeat the overall flow until all the pixels in the image frame have been detected.

Figure 4:
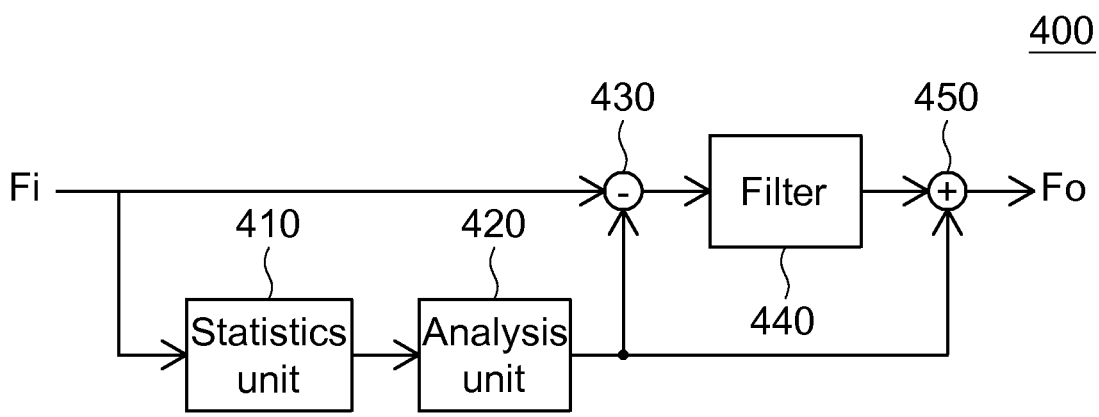
FIG. 4 is a block diagram showing an apparatus for reducing spatial noise of images according to the preferred embodiment of the invention.

FIG. 4 is a block diagram showing an apparatus 400 for reducing spatial noise of images according to the preferred embodiment of the invention. Referring to FIG. 4, the apparatus 400 includes a statistics unit 410, an analysis unit 420, a subtracter 430, a filter 440 and an adder 450. The statistics unit 410 receives an image frame Fi and operates the pixels of the image frame Fi to obtain multiple variances, respectively. The statistics unit 410 substantially builds a corresponding operating block according to each pixel, and operates all the pixels in the operating block to obtain the variances corresponding to the operating blocks. The operating blocks may be built with reference to, without limitation to, FIGS. 3A to 3C.

Figure 5:
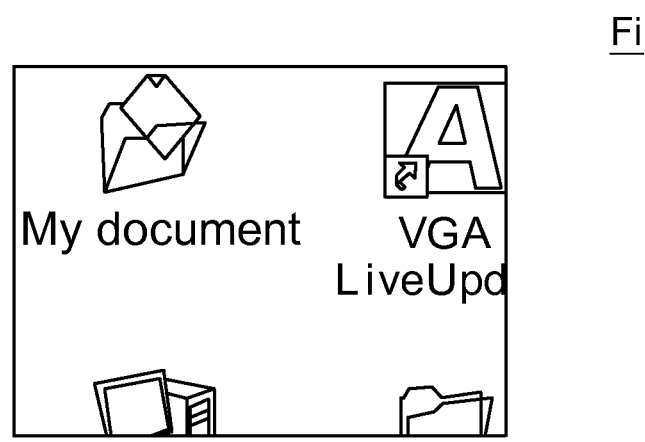
FIG. 5 is a schematic illustration showing an example of an image frame according to the preferred embodiment of the invention.
Figure 6:
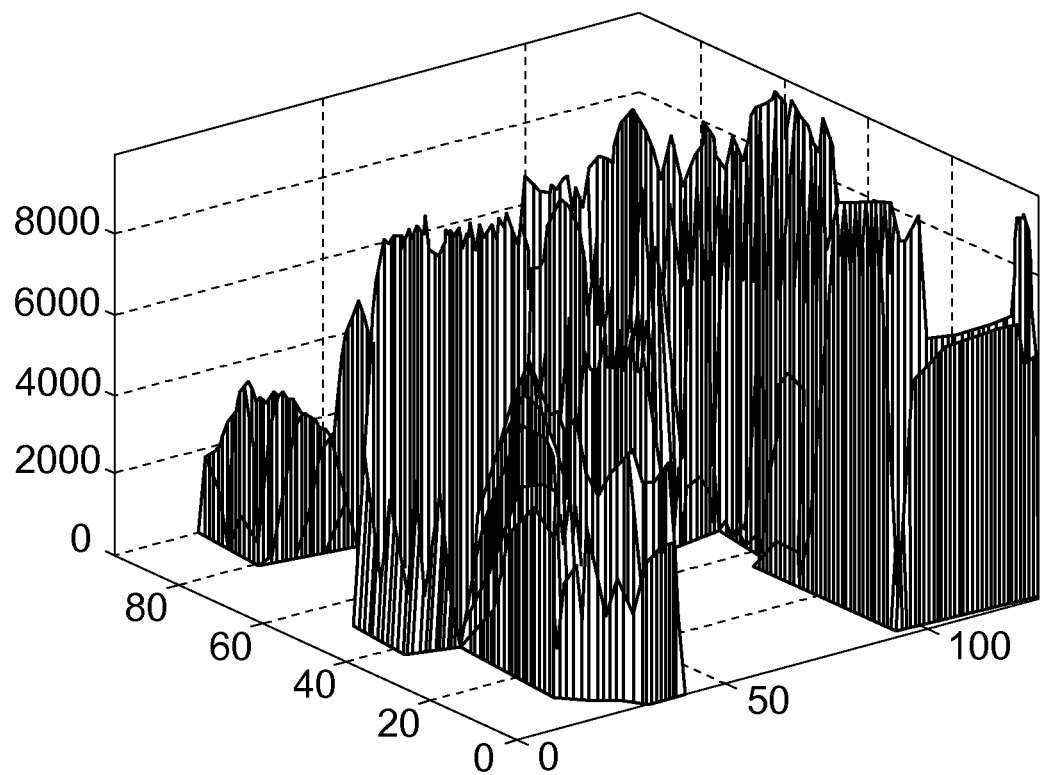
FIG. 6 is a three-dimensional distribution graph showing variances according to the preferred embodiment of the invention.

FIG. 5 is a schematic illustration showing an example of an image frame according to the preferred embodiment of the invention. FIG. 6 is a three-dimensional distribution graph showing variances according to the preferred embodiment of the invention. Referring to FIGS. 5 and 6, the statistics unit 410 performs a statistical operation on the image frame Fi containing the noise to obtain the three-dimensional variance distribution shown in FIG. 6. In FIG. 6, the projecting portion may be regarded as being characteristic, for example, having the edge information or dotted characteristic, and the smoother portion may be regarded as being not characteristic.

Thereafter, the analysis unit 420 respectively judges whether the pixels in the image frame Fi are characteristic according to many variances, obtained by the statistics unit 410. The analysis unit 420 may set a threshold, such as 2000. If the variance is greater than the threshold, then the analysis unit 420 judges that the corresponding pixel is characteristic. If the variance is smaller than the threshold, then the analysis unit 420 judges that the corresponding pixel is not characteristic. However, the analysis unit 420 is not substantially limited and may be a Sobel filter, a Canny edge detector, a Prewitt mask or the like as long as the characteristic portions in the image frame may be separated. The subtracter 430 receives the image frame Fi and outputs the pixels, which are not characteristic, according to the judgement results of the analysis unit 420.

Figure 7:
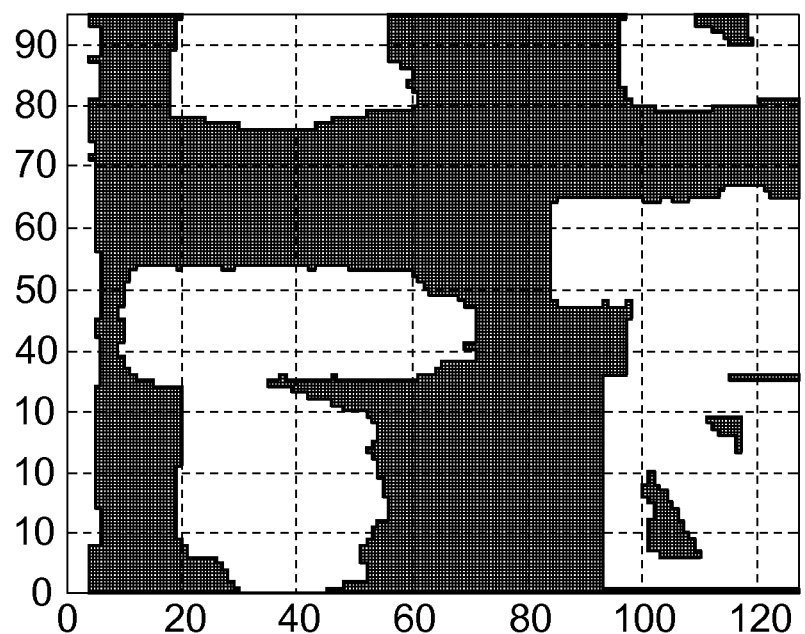
FIG. 7 is a distribution graph showing pixels, which are not characteristic, according to the preferred embodiment of the invention.

The subtracter 430 substantially cuts the pixels, which are characteristic, from the image frame Fi, and leaves the pixels, which are not characteristic. FIG. 7 is a distribution graph showing pixels, which are not characteristic, according to the preferred embodiment of the invention. In FIG. 7, the grid-like region is the region where the pixels, which are not characteristic, distribute, and is the portion in which the noise has to be eliminated. The filter 440 filters the pixels, which are outputted from the subtracter 430 and are not characteristic, to obtain multiple modulated pixel values. The adder 450 obtains and outputs a modulated image frame Fo according to the pixel values of the pixels, which are characteristic and outputted from the analysis unit 420, and the modulated pixel values outputted from the filter 440.

The detailed principles and structures of the apparatus 400 for reducing the spatial noise of the images have been described in the method of reducing the spatial noise of the images disclosed in FIG. 2, so detailed descriptions thereof will be omitted.

The method and apparatus for reducing the spatial noise of the images according to the embodiment of the invention have many advantages, and some of which are described in the following.

The invention provides the method and the apparatus for reducing the spatial noise of the images by operating the pixels in the image frame in a statistical manner, and determining the zone, where the filter may be used, according to the threshold. Thus, the characteristic portion, such as the portion with the edge information or the dotted characteristic, may be cut out, and the noise is removed from the other smooth portions indeed interfered by the noise. Consequently, the spatial noise of the images can be effectively reduced, and the edge portion in the image cannot be blurred or the portion with the dotted characteristic cannot be influenced. Thus, the detailed portions of the image can be kept more completely, and the image sharpness may be maintained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for reducing spatial noise of images, the method comprising:
    obtaining a plurality of target pixels of an image frame, wherein each of the target pixels has a pixel value; and
    for each of the target pixels, performing following steps, the following steps including:
        building an operating block corresponding to the target pixel wherein the operating block is part of the image frame;
        operating upon pixel values of the target pixel and a plurality of neighboring pixels in the operating block to obtain a variance corresponding to the operating block;
        judging whether the target pixel is characteristic according to the variance; and
        based on the judging indicating that the target pixel is not characteristic, and independently of a pixel value of the target pixel, filtering all the pixels in the operating block to obtain a modulated pixel value if the target pixel is not characteristic and updating the pixel value of the target pixel to the modulated pixel value.

2. The method according to claim 1, wherein the target pixel pertains to an image frame, and the operating block comprises an M×N rectangular region if the image frame only contains one field, wherein M and N are positive integers.

3. The method according to claim 1, wherein the target pixel pertains to an image frame, and the operating block comprises a plurality of rows of pixels, which do not neighbor on one another, if the image frame comprises a plurality of interlaced fields.

4. The method according to claim 1, wherein the target pixel and the neighboring pixels contained in the operating block do not neighbor on one another.

5. The method according to claim 1, further comprising:
    calculating an average of the pixel values of the pixels in the operating block; and
    calculating the variance according to the average and the pixel values of the pixels in the operating block.

6. The method according to claim 1, further comprising:
    pre-setting a threshold;
    judging that the target pixel is characteristic if the variance is greater than the threshold; and
    judging that the target pixel is not characteristic if the variance is smaller than the threshold.

7. The method according to claim 1, further comprising:
    not updating the pixel value of the target pixel if the target pixel is characteristic.

8. The method according to claim 1, wherein the target pixel pertains to an image frame, and the method is repeated until the plurality of pixels contained in the image frame have been detected to be characteristic or not.

9. An apparatus for reducing spatial noise of images, the apparatus comprising:
    a statistics unit for receiving an image frame and respectively operating a plurality of pixels of the image frame to obtain a plurality of variances, each of the pixels having a pixel value, wherein, for each of the pixels, the statistics unit builds a respective operating block corresponding to the pixel, and operates upon the pixels in the operating block to obtain a variance corresponding to the operating block, wherein the operating block is part of the image frame;
    an analysis unit for judging whether the pixels are characteristic according to the variances, respectively;
    a subtracter for receiving the image frame and outputting the pixels, which are not characteristic, according to judgment results of the analysis unit;
    a filter for filtering all the pixels in the operating block based on the judgment results indicating that one of the pixels in the operating block is not characteristic and independently of pixel values of the pixels in the operating block to obtain a plurality of modulated pixel values; and
    an adder for outputting a modulated image frame according to pixel values of the pixels, which are characteristic, and the modulated pixel values.

10. The apparatus according to claim 9, wherein the operating block comprises an M×N rectangular region if the image frame only contains one field, wherein M and N are positive integers.

11. The apparatus according to claim 9, wherein if the image frame contains a plurality of interlaced fields, the operating block comprises a plurality of rows of pixels, which do not neighbor on one another.

12. The apparatus according to claim 9, wherein the pixels contained in the operating block do not neighbor on one another.

13. The apparatus according to claim 9, wherein the statistics unit calculates an average of the pixel values of the pixels in the operating block, and calculates the variance corresponding to the operating block according to the average and the pixel values of the pixels in the operating block.

14. The apparatus according to claim 9, wherein the analysis unit judges that the corresponding pixel is characteristic if the variance is greater than a threshold, and the analysis unit judges that the corresponding pixel is not characteristic if the variance is smaller than the threshold.

* * * * *